(12) United States Patent
Ramanathan et al.

(10) Patent No.: US 10,175,854 B2
(45) Date of Patent: **\*Jan. 8, 2019**

(54) INTERACTION IN CHAIN VISUALIZATION

(71) Applicant: Oracle International Corporation, Redwood Shores, CA (US)

(72) Inventors: Jairam Ramanathan, Waltham, MA (US); Prashant Singh, Lexington, MA (US); Yi Dai, Winchester, MA (US); Jindrich Dinga, Santa Clara, CA (US); David Kamholz, Lyons, CO (US)

(73) Assignee: Oracle International Corporation, Redwood Shores, CA (US)

( \* ) Notice: Subject to any disclaimer, the term of this patent is extended or adjusted under 35 U.S.C. 154(b) by 231 days.

This patent is subject to a terminal disclaimer.

(21) Appl. No.: 14/644,555

(22) Filed: Mar. 11, 2015

(65) Prior Publication Data
US 2015/0378580 A1  Dec. 31, 2015

Related U.S. Application Data

(60) Provisional application No. 62/017,214, filed on Jun. 25, 2014.

(51) Int. Cl.
*G06F 3/0482* (2013.01)
*G06F 17/30* (2006.01)
(Continued)

(52) U.S. Cl.
CPC .......... *G06F 3/0482* (2013.01); *G06F 3/0485* (2013.01); *G06F 3/04817* (2013.01);
(Continued)

(58) Field of Classification Search
CPC .......... G06F 17/30554; G06F 3/04817; G06F 3/0482; G06F 3/04847; G06F 3/0485; H04L 67/10
See application file for complete search history.

(56) References Cited

U.S. PATENT DOCUMENTS 6,990,495 B1 \* 1/2006 Grason ............. G06F 17/30893
7,203,701 B1 \* 4/2007 Packebush ........ G06F 17/30961
(Continued)

OTHER PUBLICATIONS

.NetCharting Organizational Charts for asp.net 2008 3 pages.\*
(Continued)

*Primary Examiner* — Andrea N Long
(74) *Attorney, Agent, or Firm* — Trellis IP Law Group, PC

(57) ABSTRACT

A chain visualization represents first, second and third hierarchical data items from a database. The second data item descends from the first. The third descends from the second. The visualization shows an ancestors chain and a descendants chain. It has an active item location where the chains meet. The visualization shows a card linked to the ancestors chain for the first data item, a card in the active item location for the second data item, and a card linked to the descendants chain for the third data item. Users may navigate upwards or downwards in the hierarchy by activating any card outside the active item location. Users may stack cards to save screen space, and users may scroll to view different parts of the hierarchy. Users may edit information from data items represented by the cards.

20 Claims, 9 Drawing Sheets

(51) Int. Cl.
*H04L 29/08* (2006.01)
*G06F 3/0484* (2013.01)
*G06F 3/0485* (2013.01)
*G06F 3/0481* (2013.01)

(52) U.S. Cl.
CPC .... G06F 3/04847 (2013.01); G06F 17/30554 (2013.01); H04L 67/10 (2013.01)

(56) References Cited

U.S. PATENT DOCUMENTS

| | | | | |
|---|---|---|---|---|
| 7,380,217 | B2* | 5/2008 | Gvelesiani | G06Q 10/10 715/775 |
| 8,423,905 | B2* | 4/2013 | Li | G06Q 10/10 705/7.13 |
| 9,363,211 | B2* | 6/2016 | Li | G06Q 10/10 |
| 2009/0210827 | A1* | 8/2009 | Brugler | G06F 9/4443 715/854 |
| 2011/0055755 | A1* | 3/2011 | Chen | G06F 3/0482 715/810 |
| 2011/0055771 | A1* | 3/2011 | Chen | G06F 17/30873 715/854 |
| 2011/0276640 | A1* | 11/2011 | Jesse | H04L 12/5855 709/206 |
| 2012/0023455 | A1* | 1/2012 | Chen | G06F 17/30554 715/853 |
| 2013/0067390 | A1* | 3/2013 | Kwiatkowski | G06F 3/0482 715/784 |
| 2013/0167088 | A1* | 6/2013 | Mangum | G06F 3/0488 715/815 |
| 2013/0332891 | A1* | 12/2013 | Schmitlin | G06F 3/0484 715/853 |
| 2014/0229879 | A1* | 8/2014 | Lee | G06F 3/04815 715/771 |
| 2014/0236849 | A1* | 8/2014 | Flammer | G06Q 10/06 705/320 |
| 2015/0242106 | A1* | 8/2015 | Penha | G06F 3/04847 715/854 |

OTHER PUBLICATIONS

Kim Marriott, Bernd Meyer, and Laurent Tardif. 2002. Fast and efficient client-side adaptivity for SVG. In Proceedings of the 11th international conference on World Wide Web (WWW '02). ACM, New York, NY, USA, 496-507.*

Geetesh Bajaj Change Layout of Organization Chart in PowerPoint 2010 Jun. 24, 2011 6 pages.*

* cited by examiner

INTERACTION IN CHAIN VISUALIZATION

CROSS REFERENCES TO RELATED APPLICATION

This application claims priority from U.S. Provisional Patent Application Ser. No. 62/017,214, entitled METHODS FOR NAVIGATING HIERARCHICAL DATA ON MOBILE DEVICES, filed on Jun. 25, 2014, each of which is hereby incorporated by reference as if set forth in full in this application for all purposes.

This application is related to U.S. patent application Ser. No. 14/604,429, entitled TILE VISUALIZATIONS FOR NAVIGATING HIERARCHICAL DATA ON MOBILE DEVICES, filed on Jan. 23, 2015, each of which is hereby incorporated by reference as if set forth in full in this application for all purposes.

This application is further related to U.S. patent application Ser. No. 14/644,544, entitled CHAIN LAYOUT FOR DISPLAYING HIERARCHICAL DATA, filed on Mar. 11, 2015, which is hereby incorporated by reference as if set forth in full in this application for all purposes.

BACKGROUND

This invention relates to the field of user interfaces for visualizing, interacting with, and creating or modifying data in general, and in particular to data organized into hierarchies.

There are many examples of large collections of data that have a hierarchical structure (for example, a company's employee organization chart). Prior applications for displaying hierarchical data typically require the larger desktop screens and precision of interaction afforded by a mouse to be used effectively. Because of these design factors, hierarchical data visualizations developed for desktop and laptop computers may not transfer well to mobile or other electronic devices with smaller screens, less precise input devices, and fundamentally different basic operating characteristics, such as finger touch and gesture-based interfaces.

Prior desktop visualizations can allow for unrestricted or less restricted views and navigation of hierarchical data. They can include controls for scrolling, panning, and/or zooming around the view. However, this navigational flexibility can add complexity on small screens, and the visualization controls often consume substantial portions of the very limited screen space.

SUMMARY

Prior visualizations for hierarchical data typically require larger desktop screens to provide both overview and detail. The precision of interaction afforded by a mouse or other accurate pointing device is also often needed for the visualizations to be used effectively.

Chain visualizations according to embodiments of the invention can provide ways to present hierarchical data even on a small screen, such as available on a mobile device. They benefit from easy user interactivity offered by the many user gesture inputs (e.g. touch inputs, non-touch movements, etc.) available on touchscreens and image recognition input systems.

Embodiments of the invention include a method of generating a chain visualization for interactively displaying hierarchical data. The method includes the following steps. First, receiving hierarchical data from a data storage system, including at least a first data item, a second data item descended from the first data item, and a third data item descended from the second data item. Then, generating for display the chain visualization including an ancestors chain, an active item location, and a descendants chain, a first graphical object representing the first data item, wherein the first graphical object is linked to the ancestors chain, a second graphical object representing the second data item, wherein the second graphical object is displayed in the active item location, and a third graphical object representing the third data item, wherein the third graphical object is linked to the descendants chain. Next, forwarding the chain visualization to a user device display system.

In embodiments, the method may include receiving a user navigation input to activate a fourth graphical object representing a fourth data item. The embodiments may respond by determining first and second subsets of the hierarchical data, including ancestor and descendant data items in relation to the fourth data item. They update the chain visualization for display, which includes replacing a prior active item by the fourth graphical object and displaying the fourth graphical object in the active item location, generating ancestor graphical objects for first subset data items and associating these with the ancestors chain, and generating descendant graphical objects for second subset data items and associating those with the descendants chain, and finally forwarding the updated chain visualization to the device for display to the user.

Embodiments may further respond to user inputs by stacking two or more graphical objects to save screen space, or by de-stacking them. Users may edit information contained in data items represented by graphical objects. Embodiments may limit this to a first level of information, or they may allow modifying all of a second level of information contained in the data items.

Further embodiments may respond to user inputs by decrementing or incrementing a number of text lines displayed in graphical objects, by resizing the graphical objects accordingly, and by displaying more or fewer graphical objects.

Embodiments may allow users to scroll the visualization to show different parts of a hierarchy. Embodiments may scroll down and no longer display the ancestors chain, or even an active item.

Embodiments of the invention may further include a system for generating an interactive chain visualization, and a tangible, computer-readable information storage medium including instructions to generate an interactive chain visualization.

A further understanding of the nature and the advantages of particular embodiments disclosed herein may be realized by reference of the remaining portions of the specification and the attached drawings.

BRIEF DESCRIPTION OF THE DRAWINGS

The invention will be described with reference to the drawings, in which.

DESCRIPTION

Prior visualizations for hierarchical data typically require larger desktop screens to provide both overview and detail, and the precision of interaction afforded by a mouse to be used effectively.

Chain visualizations according to embodiments of the invention provide a way for a software application in a computing environment to present hierarchical data even on a small screen, such as available on a mobile device. They benefit from easy user interactivity offered by the many user gesture inputs (e.g. touch inputs, non-touch movements, etc.) available on for instance mobile devices. Embodiments may also support non-touchscreen devices by responding to traditional user inputs such as offered by mice and keyboards.

Figure 1:
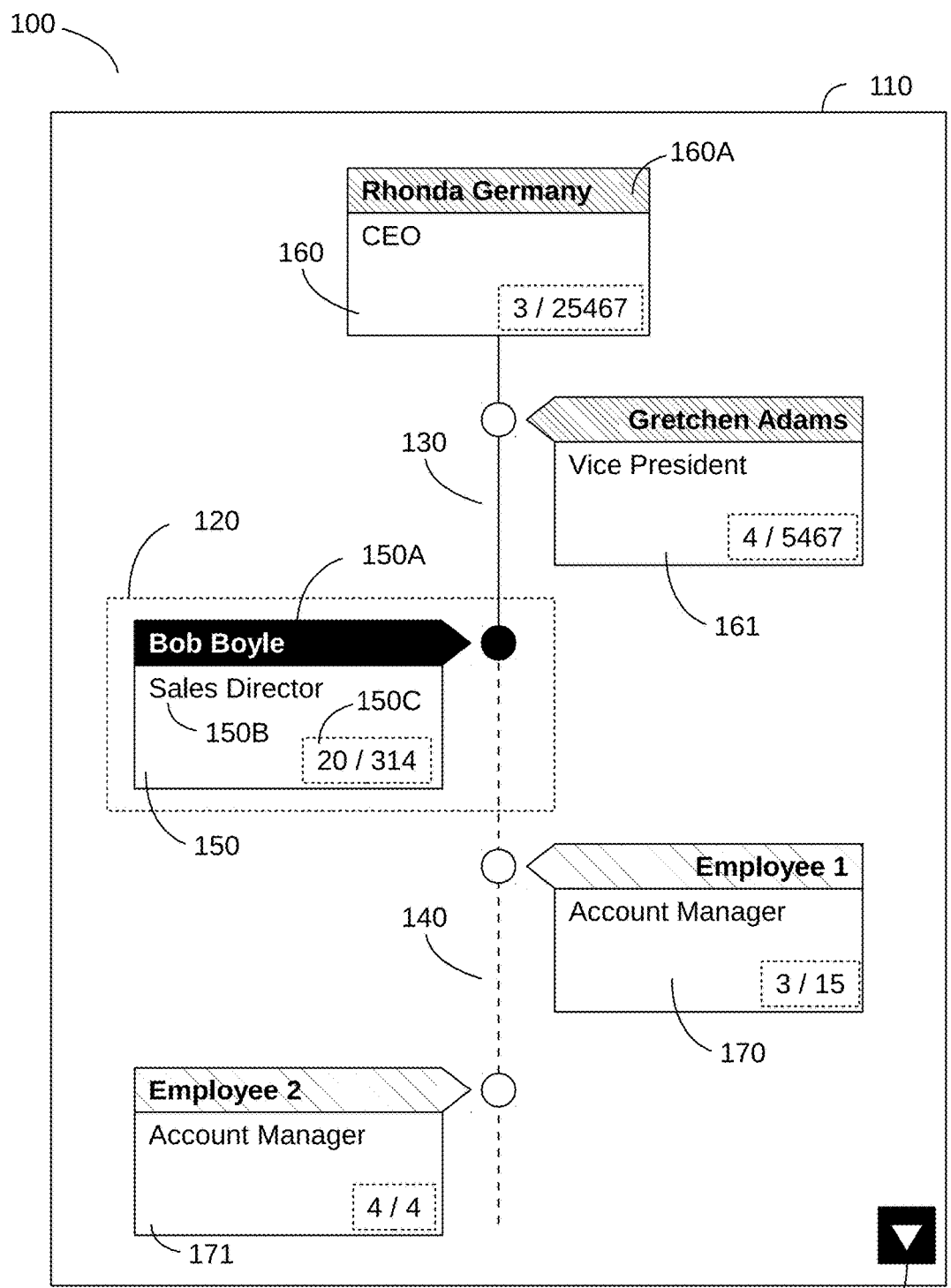
FIG. 1 illustrates a chain visualization with an active item, two ancestors, and two descendants according to an embodiment of the invention.

FIG. 1 illustrates a chain visualization 100 with an active item, two ancestors, and two descendants according to an embodiment of the invention. The chain visualization displays graphical objects representing hierarchically related data items from a hierarchical dataset. Hierarchical relations may be "immediate", i.e. where the hierarchical levels of two data items differ by one (1). In such a case, the data item with the higher hierarchical level may be called the "parent" or "immediate ancestor" and the data item with the lower hierarchical level may be called the "child" or "immediate descendant". Hierarchical relations may be "remote", i.e. where the hierarchical levels of two data items differ by two (2) or more. In such a case, the data item with the higher hierarchical level may be called the "remote ancestor" (such as a "grandparent") and the data item with the lower hierarchical level may be called the "remote descendant" (such as a "grandchild"). Data items on the same hierarchical level may be called "hierarchical peers".

In the embodiment of the invention shown in FIG. 1, a user device displays hierarchical data retrieved from a data storage system, including a first data item, a second data item (the "active data item") descended from the first data item, third and fourth data items descended from the second data item, and a fifth data item that is an ancestor of the first data item.

The visualization 100 is enclosed by a component container border 110. The visualization 100 includes an active item location 120, an ancestors chain 130, and a descendants chain 140. The ancestors chain 130 and the descendants chain 140 meet in the active item location 120. The ancestors chain 130 and/or the descendants chain 140 may be represented as lines or as other simplifications or elaborations of chains, or generally as elongated entities. This embodiment shows the ancestors chain 130 as a solid line and the descendants chain 140 as a dashed line. Some embodiments may limit descendants to a single hierarchical level, for instance to immediate descendants. Further embodiments may limit ancestors to exclude hierarchical peers and/or only allow for a direct chain of ancestors. Other variations are possible.

A graphical object 150 located in the active item location 120 represents the second data item. Graphical object 150 is "linked" to (i.e., visually associated with) both the ancestors chain 130 and the descendants chain 140. Linking may be explicitly displayed, or implicitly, as in FIG. 1, where linking is implied by block arrow 150A directed at a point where ancestors chain 130 and descendants chain 140 meet.

Graphical objects 160 and 161 represent the fifth and the first data item, which are a remote and an immediate ancestor of the active data item. Graphical objects 160 and 161 are visually associated with the ancestors chain 130.

Graphical objects 170 and 171 represent the third and fourth data items, which are hierarchical peers as they are both immediate descendants of the active data item. Graphical objects 170 and 171 are visually associated with the descendants chain 140.

Although this embodiment displays a single column of graphical objects on each side of the two chains, other embodiments may display a single column on just one side of the two chains, or multiple columns on one or both sides of the two chains.

Embodiments of the invention may visually style the graphical objects 150, 160-161 and 170-171 as cards, for example, or other types of graphical icons or entities, with each card representing one or more data items in the hierarchical dataset. In the embodiment illustrated in FIG. 1, each card represents a single data item. Card 161 represents the first data item, card 150 the second data item, card 170 the third data item, card 171 the fourth data item, and card 160 represents the fifth data item.

Graphical objects may display various properties contained in the data items they represent. For example, graphical object 150 includes a name label 150A in the shape of a block arrow pointing at a circle on the chain(s), representing a name of its represented data item (e.g. employee name). It also includes a label 150B displaying another property of the represented data item (e.g. employee function), and an indicator 150C showing, for instance, the numbers of immediate and total hierarchical descendants. Graphical objects may include shapes, text labels, hypertexts, icons, images, context popups, callouts, buttons, and any other controls used in graphical user interfaces. Embodiments could visualize a graphical object or a control therein with color coding, hashing, texture, shading, highlighting, or changed contrast to reveal underlying data item information, or to reflect user interaction or customization.

The example embodiment of FIG. 1 styles card 160 slightly differently than the other cards. Name label 160A is not in the shape of a block arrow pointing at the ancestors chain, but rather in the shape of a simple rectangle. The embodiment locates card 160 on top of the ancestors chain, terminating it, to indicate that it represents the highest level of ancestor.

Embodiments of the invention may graphically distinguish cards for the active data item, its ancestors, and its descendants, for example by using color coding. In the embodiment illustrated in FIG. 1, block arrow 150A is rendered in a first color, whereas the name label and block arrow of ancestors 160-161 are rendered in a second color and block arrows of descendants 170-171 are rendered in a third color. Embodiments that allow for multiple hierarchical levels of descendants may give each level a distinctive rendering or color coding.

FIG. 1 shows, in indicator 150C, that Sales Director Bob Boyle has twenty direct reports. However, this embodiment shows only cards 170 for Employee 1 and 171 for Employee 2. It also shows a scroll indicator or control 180 to indicate the availability of cards for descendants beyond those shown in cards 170 and 171. Embodiments may show any commonly understood scroll indicator or control, including for instance a scroll bar, scroll arrows, and partially displayed or stacked cards. Embodiments may respond to any common user scroll inputs. These may, for instance, include swiping or dragging an object in the visualization, or moving a handle on a scroll bar, or, in case of availability of a keyboard, using cursor up and down keys or page up and down keys.

The visualization 100 is a vertical embodiment of the invention, meaning that the ancestors chain 130 and descendants chain 140 are displayed vertically, with cards on one or both sides. Embodiments may respond to user vertical scroll inputs by displaying lower or higher parts of the hierarchy related to the active data item.

Embodiments of the invention may limit parts of a hierarchy viewable for a user based on a user authorization level. And embodiments may limit the information—contained in a data item—that is accessible for reading or writing by a user, based on the user's authorization level.

Embodiments of the invention may allow for navigation within the hierarchy in several ways, dependent on the available types of user interaction. For instance, if the display includes a touchscreen, tapping a card may activate it. In response to receiving a user tap input on card 161, the embodiment may activate card 161, move it to the active item location (or move the active item location to the location of card 161), adjust its display style to show it as the active card, move card 150 from the active item location to a location linked with the descendants chain 140, and adjust its display style. The embodiment may remove all other cards from locations visually associated with the descendants chain 140 and instead display cards representing data items that are additional descendants of the first data item.

In response to receiving a user tap input on card 170, the embodiment may activate card 170, move it to the active item location, adjust its display style to show it as the active card, move card 150 from the active item location, insert it at the lowest position on the ancestors chain 130, and adjust its display style. The embodiment may remove all cards from locations visually associated with the descendants chain 140 and instead display cards representing data items that are descendants of the third data item.

Figure 2:
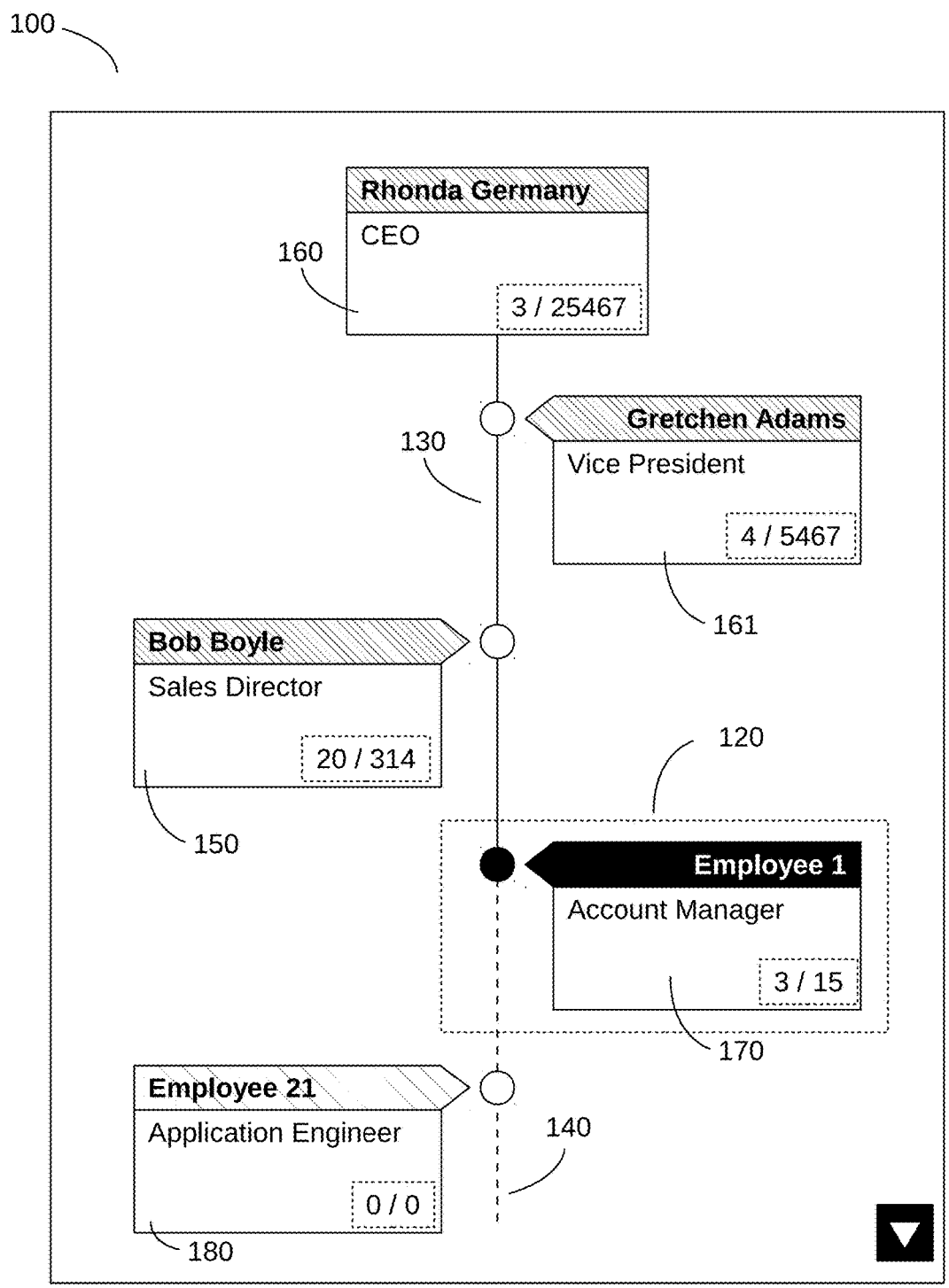
FIG. 2 illustrates the chain visualization of FIG. 1 after a descendant has been activated, according to an embodiment of the invention.

FIG. 2 illustrates the chain visualization 100 of FIG. 1 after descendant 170 has been activated, according to an embodiment of the invention. This embodiment has not scrolled the cards. Instead, it has moved active item location 120 to include the location of the card 170 for Employee 1; it has extended ancestors chain 130 and shortened the visible part of descendants chain 140 such that they again meet in the active item location 120; and it has applied updated styles showing that card 170 now represents the active data item, and that card 150 now represents an ancestor data item. It has replaced formerly visible cards 170 and 171 by card 180 for Employee 21, representing a descendant of the new active data item for Employee 1. Ancestors visually associated with the ancestors chain 130 now include card 150 for Bob Boyle, card 160 for Rhonda Germany, and card 161 for Gretchen Adams.

Generally, tapping, or mouse double-clicking, or otherwise activating an item visually associated with the ancestors chain 130 allows for navigation towards higher levels in the hierarchy. Likewise, tapping, mouse double-clicking, or otherwise activating an item visually associated with the descendants chain 140 allows for navigation towards lower levels in the hierarchy.

In general, embodiments of the invention may implement navigation as follows. A visualization with first, second and third graphical objects, representing a first, second, and third data items respectively, where the second data item is the active item, the first data item is the active item's immediate ancestor, and the third data item is the active item's immediate descendant, may respond as follows to a user navigation input activating a fourth graphical object representing a fourth data item: determining a first subset of the hierarchical data, the first subset including data items that are hierarchical ancestors of the fourth data item; determining a second subset of the hierarchical data, the second subset including data items that are hierarchical descendants of the fourth data item; updating the chain visualization for display, including: removing a graphical object representing a previously active data item from the active data item location; displaying the fourth graphical object in the active item location; generating for display ancestor graphical objects for at least part of the first subset data items and visually associating the ancestor graphical objects with the ancestors chain; generating for display descendant graphical objects for at least part of the second subset data items and visually associating the descendant graphical objects with the descendants chain; and forwarding the updated chain visualization to the device for display to the user. Some embodiments may filter on additional data item properties to select members of the first and second hierarchical data subsets. Such data item properties may be determined by the user or by the application. Further embodiments may filter on the basis of a user's authorized level to access some or all of the data items and/or data item properties.

Figure 3:
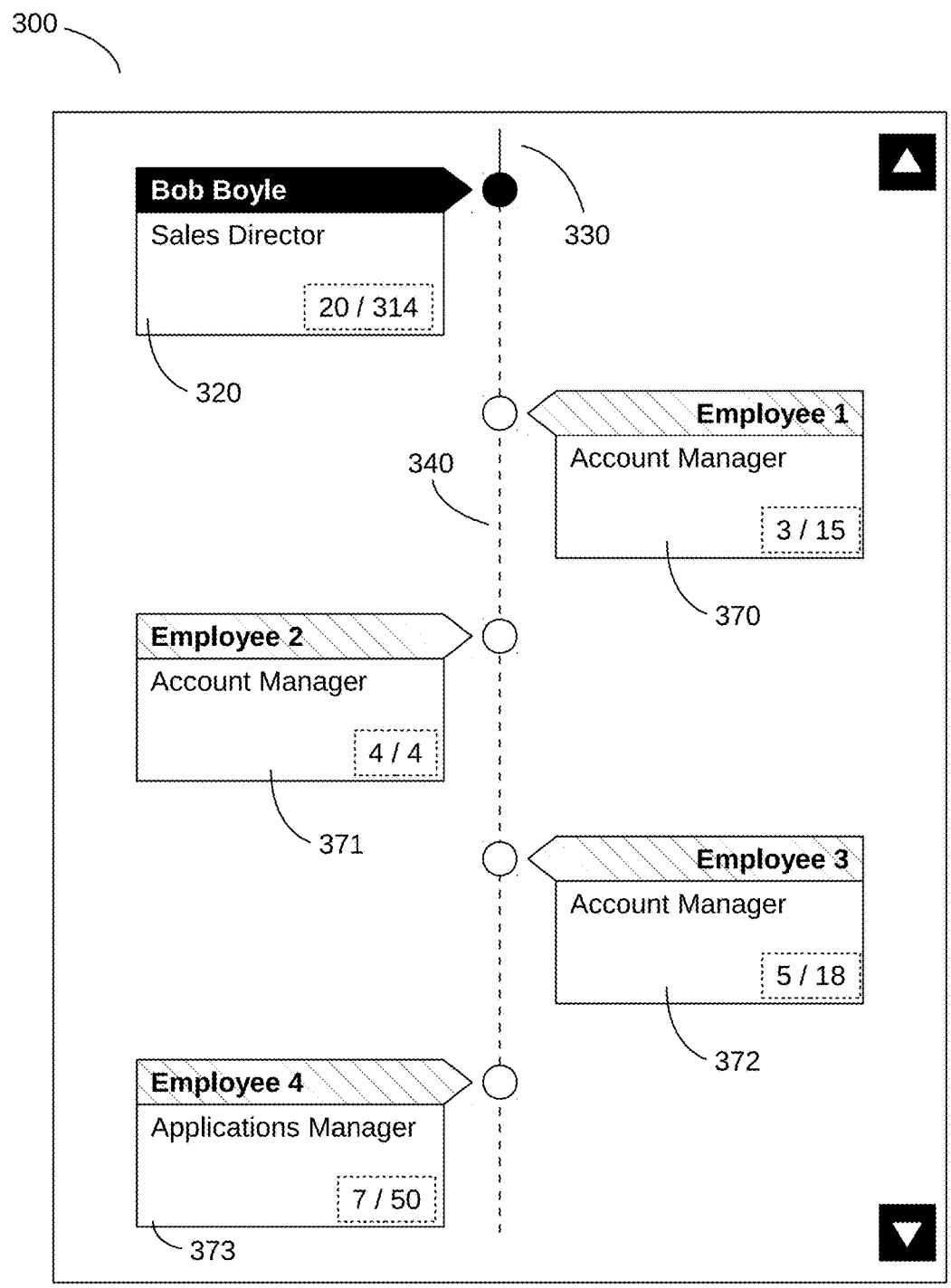
FIG. 3 illustrates a stage of scrolling down according to an embodiment of the invention.

FIG. 3 illustrates a stage of scrolling down according to an embodiment of the invention. Having received one or more user scroll down inputs, the embodiment places card 320 representing the active data item at the top of visualization 300. The visualization 300 shows part of the descendants chain 340, but only a remnant of the ascendants chain 330. This allows for displaying several additional descendant cards. In this case, the embodiment displays descendant cards 370-373 for descendants Employee 1 through Employee 4. Again, embodiments may display any commonly understood scroll indicator or control, such as a scroll bar or scroll arrows, or ancestor cards stacked under the active card 320. Ancestors chain 330 and descendants chain 340 are both unterminated, giving a user additional indication that both scrolling up and scrolling down are available.

Figure 4:
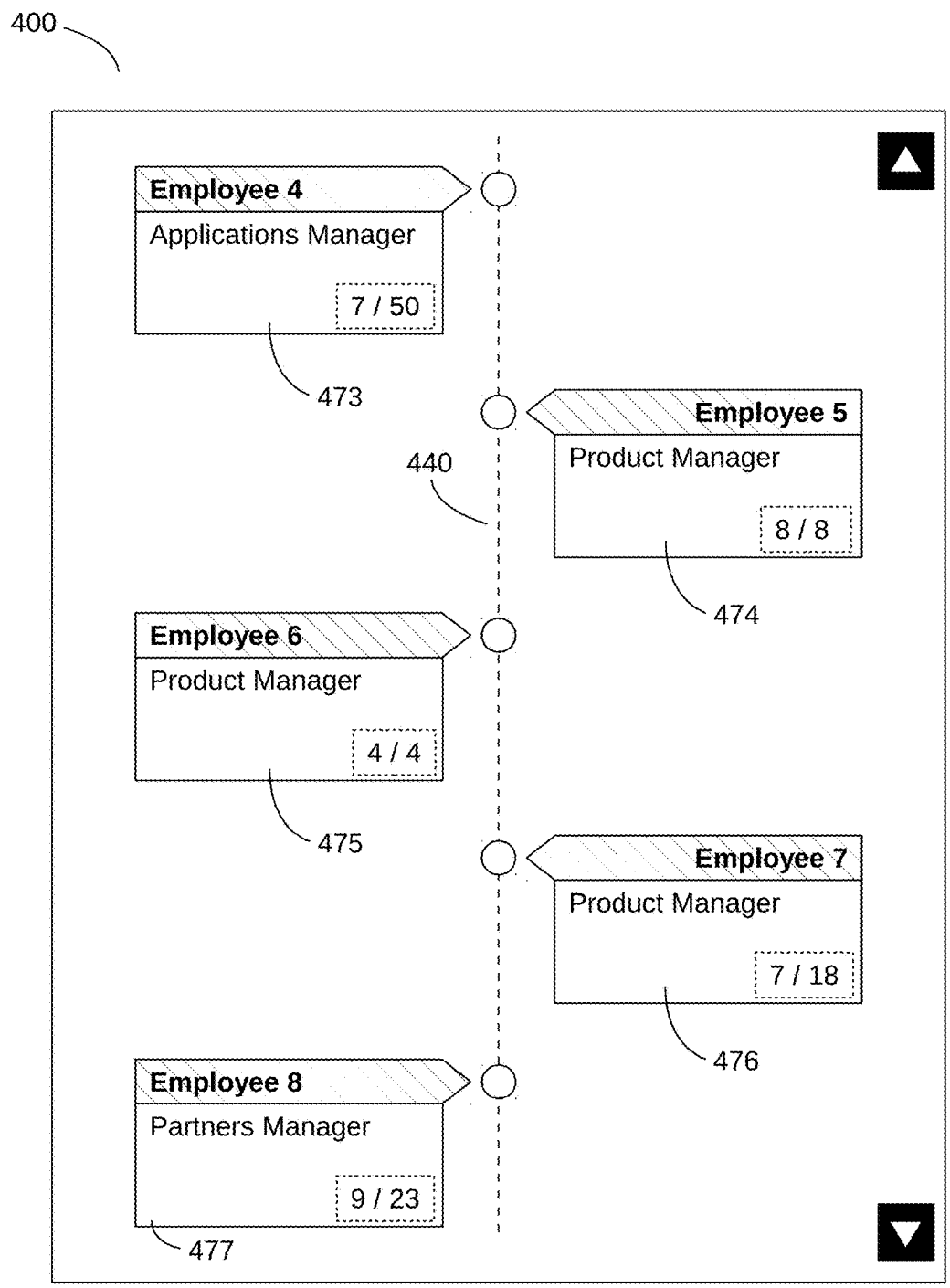
FIG. 4 illustrates a further stage of scrolling down according to an embodiment of the invention.

FIG. 4 illustrates a further stage of scrolling down according to an embodiment of the invention. Having received on or more additional user scroll down inputs, the embodiment no longer displays a card for the active data item. Visualization 400 shows only a lower part of the descendants chain 440. This allows for displaying an increased number of descendant cards. In this case, the embodiment displays descendant cards 473-477 for descendants Employee 4 through Employee 8.

The number of cards displayed simultaneously could be increased even further. It may be noted that cards 473, 475 and 477 on the left side of the descendants chain 440, and cards 474 and 476 on the right side of the descendants chain 440 have considerable vertical whitespace in between them. Embodiments could reduce the vertical whitespace and place the cards vertically closer together upon receiving, for instance, a user's vertical pinch input (on a touchscreen).

Conversely, they could increase the vertical whitespace and place the cards vertically farther apart upon receiving a user's vertical spread input (on a touchscreen).

Figure 5:
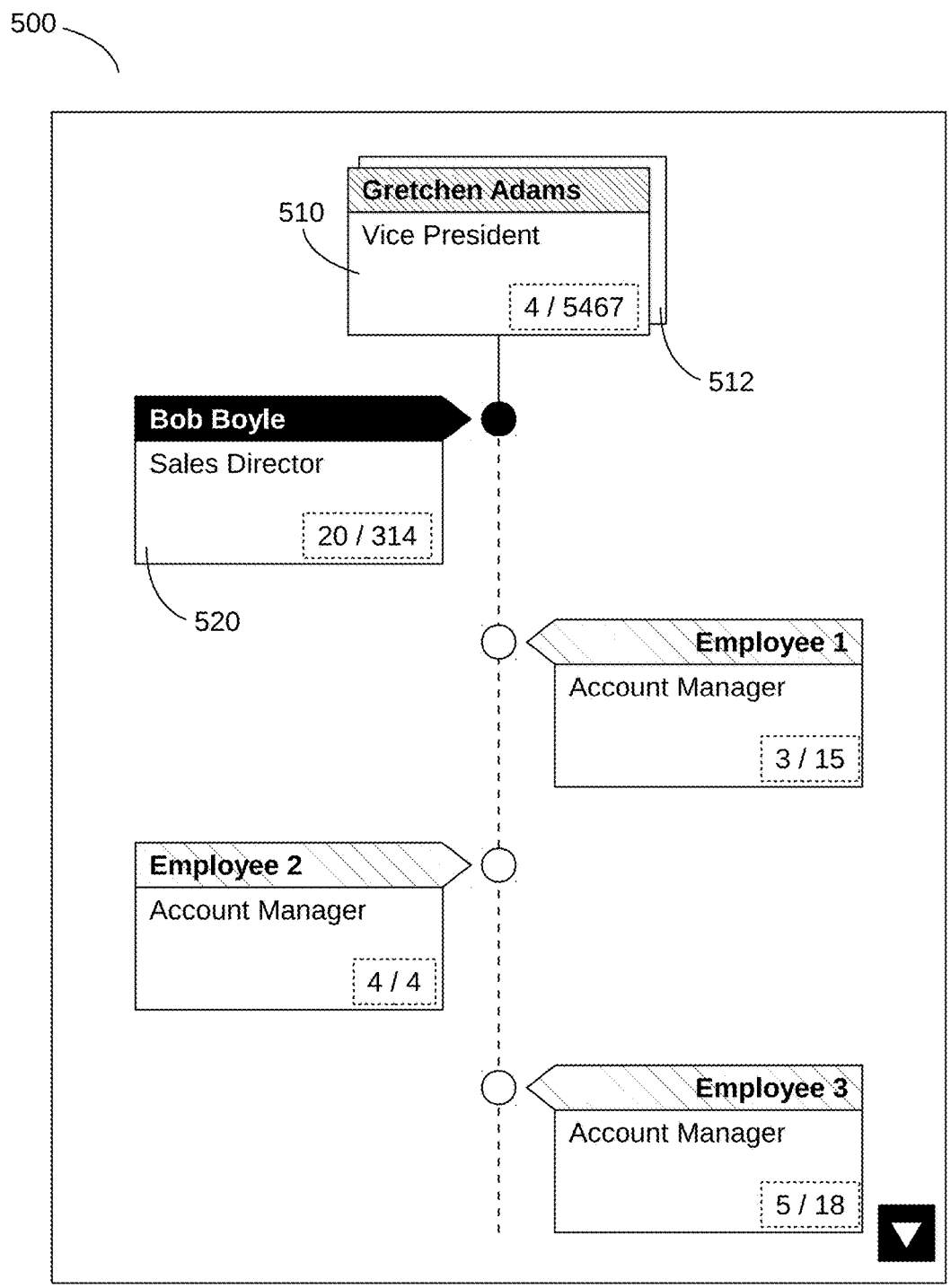
FIG. 5 illustrates a chain visualization with stacked ancestors according to an embodiment of the invention.

FIG. 5 illustrates a chain visualization 500 with stacked ancestors according to an embodiment of the invention. As discussed above, embodiments may respond to a vertical pinch user input by reducing the amount of whitespace in between cards. The amount of whitespace reduction can be proportional to the amount of pinch applied. When sufficient pinch is applied to fully take away whitespace, embodiments may respond to a further pinch input by stacking cards to which the pinch is applied, while leaving whitespace between other cards unchanged, or at a minimum distance. FIG. 5 shows the result of sufficient vertical pinch user input applied to ancestor cards in FIG. 1. In this example embodiment, direct ancestor card 510 is shown as if on top of a stack, the stack representing indirect ancestors. Other embodiments may show, for instance, the highest ancestor on top of the stack, such as CEO Rhonda Germany of FIG. 1.

In an embodiment as in FIG. 5, graphical object 510-512 may be a single graphical object representing two or more data items (in this case two). This embodiment shows the ancestor cards in a mostly overlapping arrangement to make them appear as a stack of cards, wherein card 510 represents the immediate ancestor of active data item card 520. Card 510 partially overlaps card 512. Some embodiments may show the nearest level ancestor on top of the stack, whereas other embodiments may show, for example, the highest level ancestor on top of the stack. The stack indicates to a user that additional ancestor cards are viewable, for instance by scrolling up. Embodiments may add further scroll indicators or scroll controls as deemed appropriate.

Alternatively, or additionally, in response to vertical spread user inputs applied to the stacked cards 510-512, embodiments may de-stack the cards. Embodiments may respond to a further, or additional, vertical spread gesture by increasing the amount of vertical whitespace.

Figure 6:
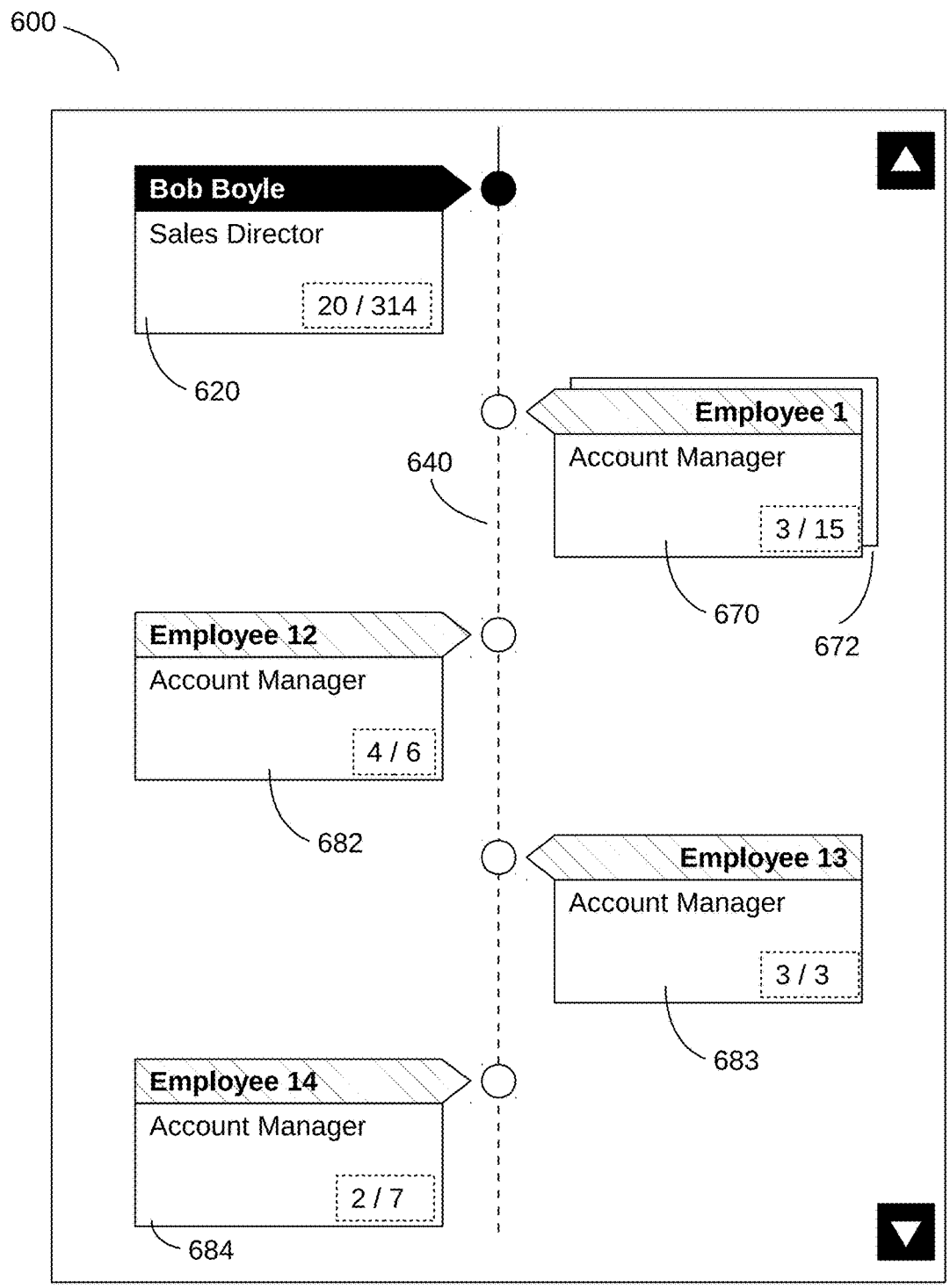
FIG. 6 illustrates a chain visualization with stacked descendants according to an embodiment of the invention.

FIG. 6 illustrates a chain visualization 600 with stacked descendants 670-672 according to an embodiment of the invention. Active item card 620 is displayed (has been scrolled to) the top of the visualization 600. The user has applied one or more vertical pinch gestures to stack descendant card 670 with other descendant cards 672. As a result, descendants chain 640 is locally compressed, allowing several lower descendant cards 682-684 to be shown simultaneously with active item card 620.

In general, embodiments with a vertical ancestors chain and a vertical descendants chain may respond to an initial vertical pinch user input applied to two cards by reducing vertical whitespace, and to a further vertical pinch user input by stacking cards. In the same fashion, such embodiments may respond to an initial vertical spread user input applied to stacked cards by unstacking cards (if applicable) and to a further vertical spread user input applied to two cards that are not stacked by increasing vertical whitespace.

Further embodiments may provide a "semantic zoom" feature. For example, in response to a pinch gesture user input outside any cards, or outside of the ancestors chain and the descendants chain, an embodiment may reduce a number of text lines shown in the cards, thereby reducing the information visible in the cards and allowing for more (resized) cards to be visible. In response to, for example, a spread gesture user input outside any cards, or outside of the ancestors chain and the descendants chain, the embodiment may increase the number of text lines shown in the cards, thereby increasing the information visible in the cards and allowing for fewer (resized) cards to be visible. The embodiment may, each time a pinch or spread gesture user input is applied, decrement or increment the number of text lines shown in the cards by one, until a minimum or a maximum number of text lines has been reached. Other embodiments may decrement or increment the number of text lines by more than one.

Figure 7:
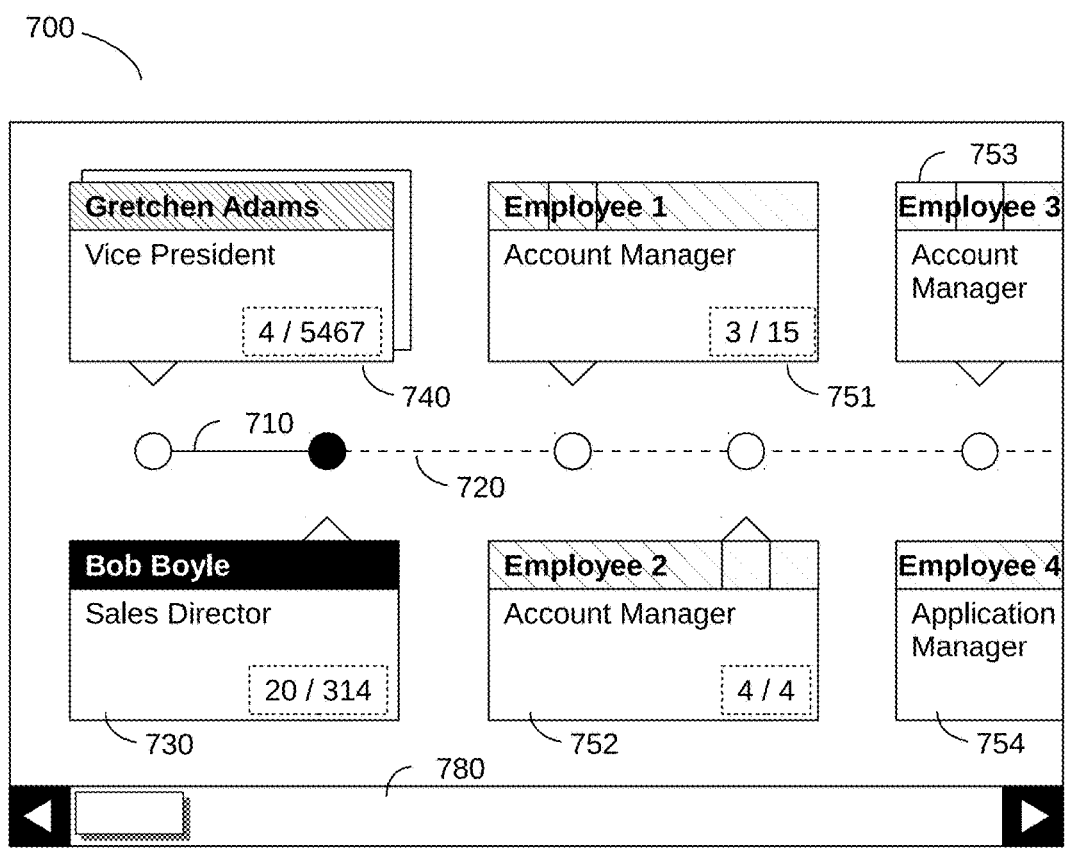
FIG. 7 illustrates a horizontal chain visualization according to an embodiment of the invention.

FIG. 7 illustrates a horizontal chain visualization 700 according to an embodiment of the invention. It displays the ancestors chain 710 and descendants chain 720 horizontally, with a single row of cards representing data items each above and below the two chains. Again, the three types of cards representing ancestor data items (card 740), the active data item (card 730), and descendant data items (cards 751-754) are each styled distinctly. This example horizontal embodiment shows the possibility to scroll horizontally on the left hand side by stacking the ancestor cards 740, and on the right hand side by partially displaying cards 753 and 754. Additionally, it has a scrollbar 780 to indicate that, and in which direction(s), scrolling is possible.

Embodiments of the invention may determine the number of simultaneously visible cards as a function of the screen size and orientation. For instance, a tablet computer could display more rows or columns of cards than a smartphone. On the other hand, a smartphone or a tablet computer connected with a monitor or television screen could display yet more rows and/or columns. Further embodiments may responsively or dynamically resize and arrange graphical objects representing data items to accommodate the size and orientation of the available display screen. Yet further embodiments may change the orientation of the ancestors chain and descendants chain in response to a change in screen orientation. For example, a screen held horizontally may show a horizontal chain visualization. When the user changes the screen orientation and holds it vertically, the orientation of the visualization may become vertical too. Embodiments may interpret user inputs, or gestures, based on the orientation of the visualization. For example, a user's vertical pinch input on a vertically oriented visualization may activate the same function as the user's horizontal input on a horizontally oriented visualization. If the orientation of a visualization changes dynamically, the interpretation of user inputs may change along with it.

Embodiments of the invention may allow for user interaction in various other ways. Some user input gestures may be tied to functions that intuitively correspond to the gesture, such as scrolling upon receiving a user swipe input in the direction of the visualization orientation. Other user inputs may be tied to functions based on a correspondence in frequency of use, such as using a tap gesture to activate a card and navigate in the hierarchy. More generally, since any user input could be tied to any chain visualization function, a user input may be tied to a function based on the need to provide user-friendly interaction capabilities. Since functionality requirements may vary based on the types of hierarchy presented and based on an application in which a chain visualization may be used, different embodiments may provide different mappings between user inputs and visualization functions.

Embodiments of the invention may respond to, for instance, a user's long press of a card (touch/hold), by allowing the user to edit information shown, or to view and edit a first level of information of the data item represented by the card. In response to a horizontal spread of a card (in a vertically oriented visualization), for instance, embodiments may allow the user to view and edit a second level of information of the data item represented by the card, wherein the second level of information could be the full data that the user has authorized access to. The embodiments may present such detailed information in a window that partially overlaps, or temporarily replaces, the chains and cards. Or they may present such information in another way suitable for the information, including visually or aurally.

Embodiments of the invention may allow users to select one or more cards without activating them. This can be achieved through any available user input, including for instance long-pressing a card on a touchscreen, or single-clicking with a mouse. Deselecting a card could be achieved, for instance, by repeating the same user input, and deselecting all cards could be achieved, for instance, by tapping or clicking an unoccupied area of the visualization, or by tapping or clicking the active card. Card selection allows a user further interaction with the data item represented by the card. This allows for adding, removing or modifying information contained in the data item, moving or removing the data item altogether, or generally any user interaction that is performed on hierarchical data. Upon selecting two or more cards, embodiments may provide a "drawer" function, such as described in the hereto related US patent application "Tile Visualizations For Navigating Hierarchical Data On Mobile Devices" (application number ####).

Further embodiments of the invention may select cards, without activating them, through the use of a filter function. For example, cards may be selected on the basis of a data item property, or combination of properties, in response to a user applying a selection filter.

Further interactive functions offered by embodiments of the invention include: removing a data item from the hierarchy, for instance by horizontally swiping its card in a vertically oriented visualization; inserting a new data item from the hierarchy, for instance with a horizontal swipe input towards the ancestors chain or descendants chain vertically in between two existing cards; moving a data item; hiding cards; un-hiding cards; and generally any function that is interactively performed on hierarchical data.

Figure 8:
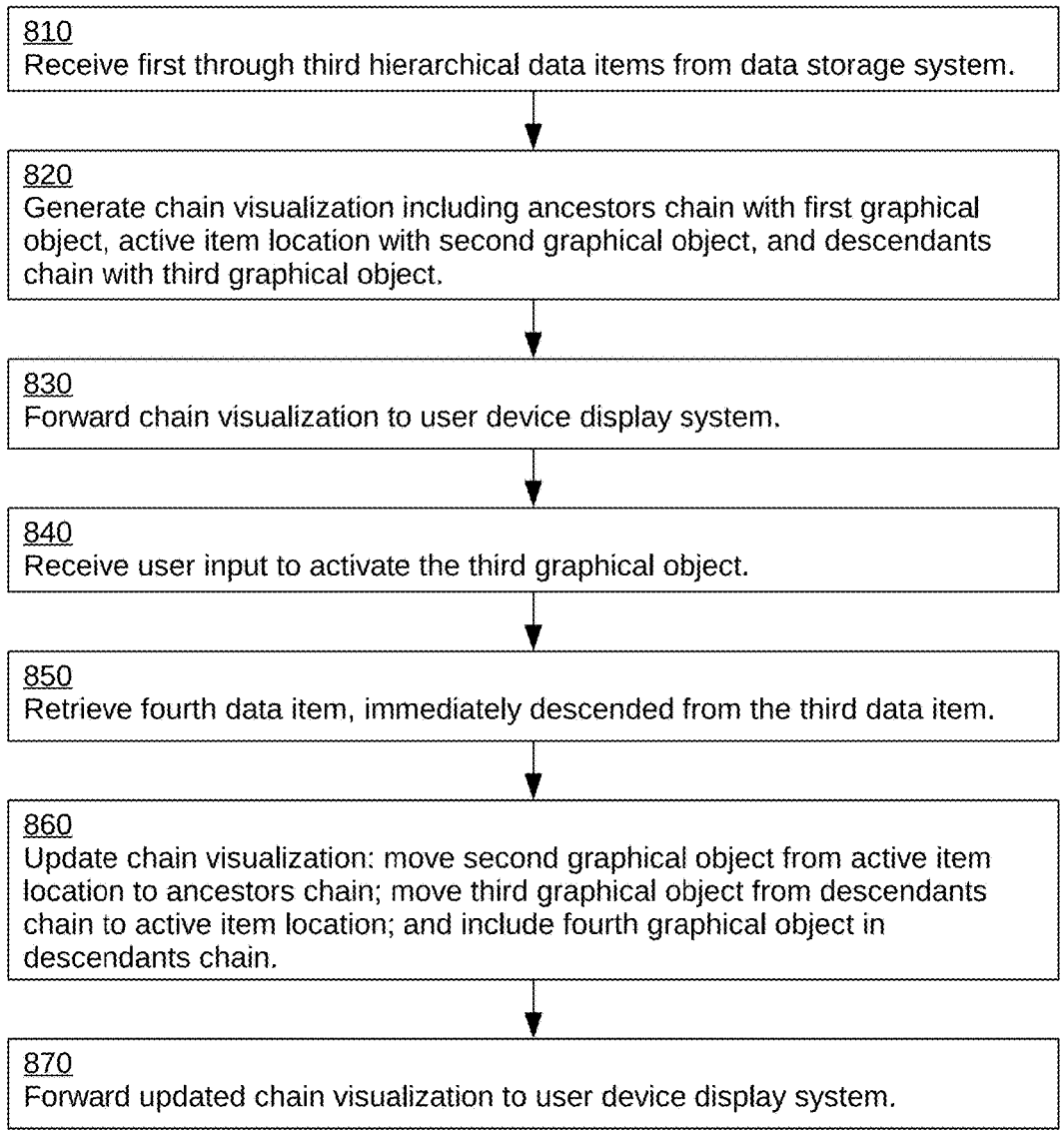
FIG. 8 illustrates a method of generating a chain visualization for interactively displaying hierarchical data according to an embodiment of the invention.

FIG. 8 illustrates a method 800 of generating a chain visualization for interactively displaying hierarchical data on a user device in a computing environment, the computing environment including a software application, a user device screen, and a system for receiving user inputs, according to an embodiment of the invention. The method comprises the following steps.

Step 810—retrieving a set of hierarchical data items from a database or other data storage system. Data items may include hierarchical information as well as other properties and information. In response to a query specified by a user or a software application, and based on associated filter criteria, embodiments retrieve at least a first data item, a second data item, wherein the first data item has a hierarchical parent relation to the second data item, and a third data item, wherein the second data item has a hierarchical parent relation to the third data item. Further embodiments may retrieve any number of data items having hierarchical relations with the second data item. Some embodiments may limit descendants to a single hierarchical level, for instance to immediate descendants. Those or other embodiments may limit ancestors to exclude hierarchical peers and/or only allow for a direct chain of ancestors.

Step 820—generating for display a chain visualization including an ancestors chain with a first graphical object representing the first data item, an active item location with a second graphical object representing the second data item, and a descendants chain with a third graphical object representing the third data item. Some embodiments may display the ancestors chain and the descendants chain as vertical chains or lines, or generally as elongated vertical entities. Other embodiments may display the ancestors chain and the descendants chain as elongated horizontal entities. The ancestors chain and the descendants chain meet in the active item location. Embodiments visually associate graphical objects with the ancestors chain and/or the descendants chain. Embodiments of the invention may visually style the graphical objects as cards, for example, or other types of graphical icons or entities, with each card representing one or more data items in the hierarchical dataset. Graphical objects may display various properties contained in the data items they represent. Graphical objects may include shapes, text labels, hypertexts, icons, images, context popups, callouts, buttons, and any other controls commonly used in graphical user interfaces. Embodiments could visualize a graphical object or a control therein with color coding, hashing, texture, shading, highlighting, or changed contrast to reveal underlying data item information, or to reflect user interaction or customization. Embodiments may graphically distinguish cards for the active data item, its ancestors, and its descendants, for example by using color coding. The visualization may be scrollable in the direction of the chains to show cards for additional data items. Embodiments of the invention may allow for receiving user inputs to display or modify information contained in the data items.

Step 830—forwarding the chain visualization to a user device display system. The user device may include a large screen, such as a monitor employed in a sports stadium, or a small screen, such as on a watch-styled wearable device, or any other size screen. The user device may include, for example, a television monitor, desktop monitor, notebook computer, tablet, or a mobile phone.

Step 840—receiving a user input to activate the third graphical object. For instance, if the device display includes a touchscreen, tapping the third graphical object may activate it. If the device display does not include a touchscreen, double-clicking the third graphical object with a mouse may activate it. In general, embodiments may use any commonly used user input event to activate a graphical object.

Step 850—in response to receiving the user input to activate the third graphical object, retrieving a fourth data item from the data storage system, wherein the fourth data item is immediately descended from the third data item (i.e. the fourth data item is a child of the third data item) or remotely descended from the third data item (i.e. the fourth data item is a "grandchild" or further descendant of the third data item). Embodiments may retrieve additional data items that are immediately or remotely descended from the third data item. Some embodiments may only retrieve the fourth or additional item if it is a child of the third data item. Other embodiments may also, or instead, retrieve data items that are descendants of the third data item at one or more lower hierarchical levels.

Upon activating a (graphical object representing a) data item, embodiments determine two subsets of the hierarchical data. The first hierarchical data subset includes data items (if any) that are hierarchical ancestors of the (newly) active data item. The second hierarchical data subset includes data items (if any) that are hierarchical descendants of the active data item. Some embodiments may filter on additional data item properties to select members of the first and second hierarchical data subsets. Such data item properties may be determined by the user or by the application. Further embodiments may filter on the basis of a user's authorized level to access some or all of the data items and/or data item properties.

Step 860—still in response to receiving the user input to activate the third graphical object, updating the chain visualization for display, including moving the second graphical object from the active item location to the ancestors chain, moving the third graphical object from the descendants chain to the active item location, and generating a fourth graphical object representing the fourth data item, and linking the fourth graphical object to the descendants chain. Embodiments may include additional graphical objects representing additional data items that are members of the second hierarchical data subset, and link those additional graphical objects to the descendants chain.

Step 870—still in response to receiving the user input to activate the third graphical object, forwarding the updated chain visualization to the user device display system.

Embodiments may respond to changes in user device screen orientation and/or size; for instance they may change an orientation of the visualization, or they may change a number of simultaneously displayed graphical objects.

Embodiments of the invention may provide a "drawer" function, by generating a drawer window for display on the device, and displaying graphical objects for multiple selected or otherwise queried or filtered data items, and allowing user interaction on the selected or otherwise queried or filtered data items.

Figure 9:
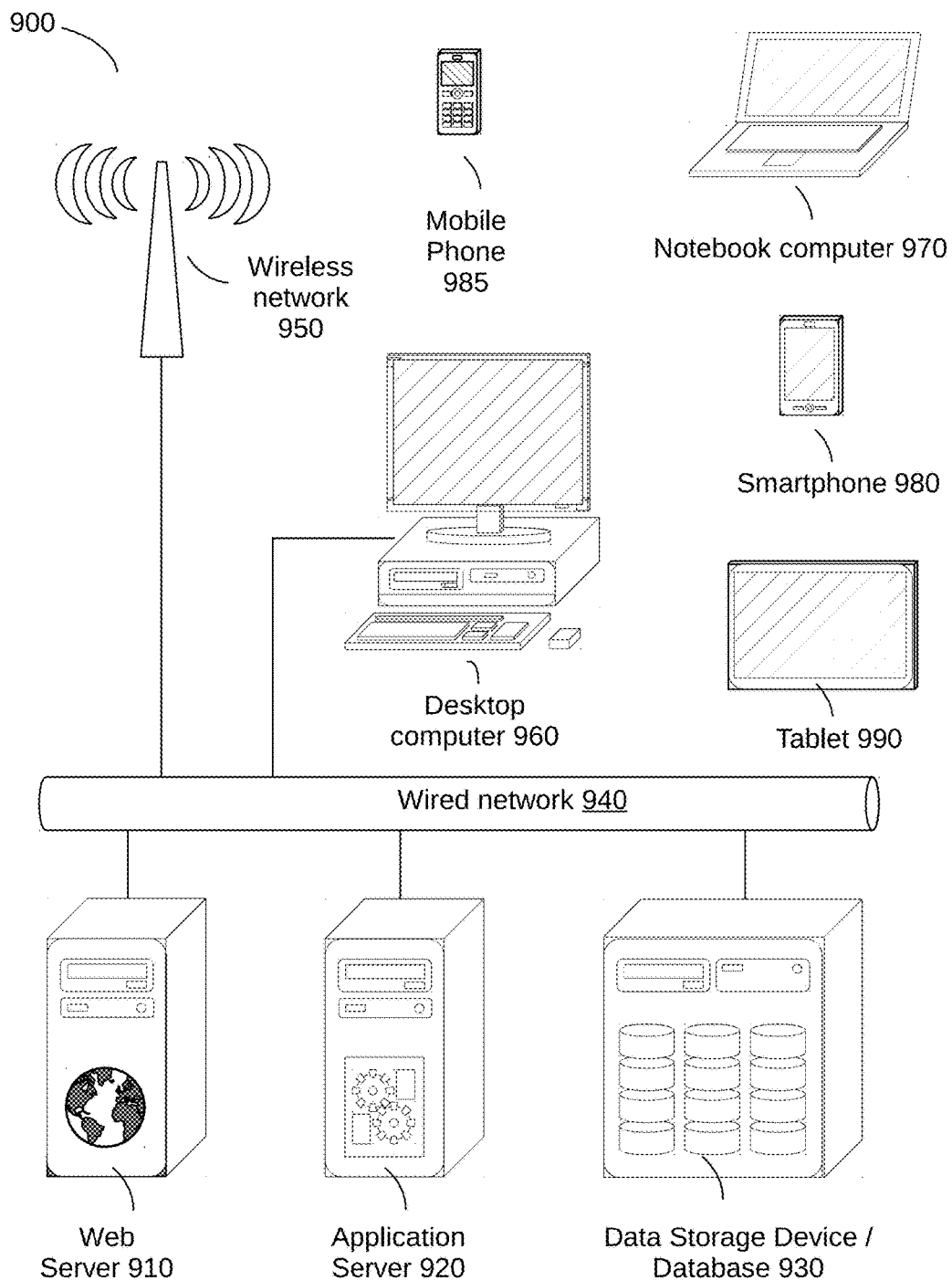
FIG. 9 illustrates an example system capable of generating and displaying chain visualizations according to embodiments of the invention.

FIG. 9 illustrates an example system 900 capable of generating and displaying chain visualizations according to embodiments of the invention. Embodiments of the invention may be implemented as standalone applications (for example, residing in a user device) or as web-based applications implemented using a combination of client-side and server-side code. The system includes user devices 960-990 including desktop computers 960, notebook computers 970, smartphones 980, mobile phones 985, and tablets 990. The system can interface with any type of user device, such as a thin-client computer, Internet-enabled mobile telephone, mobile Internet access device, tablet, electronic book, or personal digital assistant, capable of displaying and navigating web pages or other types of electronic documents and user interfaces, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

Application server 920 operates one or more applications. The applications can be implemented as one or more scripts or programs written in any programming language, such as Java, C, C++, C#, or any scripting language, such as JavaScript or ECMAScript, Perl, PHP, Python, Ruby, or TCL. Applications can be built using libraries or application frameworks, such as Rails, Enterprise JavaBeans, or .NET. Web content can created using HTML, CSS, and other web technology, including templating languages and parsers.

The data applications on application server 920 process input data and user computer requests and can store or retrieve data from data storage device or database 930. Database 930 stores data created and used by the data applications. In an embodiment, the database 930 is a relational database that is adapted to store, update, and retrieve data in response to SQL format commands or other database query languages. Other embodiments may use unstructured data storage architectures and NoSQL databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computers.

An electronic communication network 940-950 enables communication between user computers 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network; wide-area networks, such as the Internet; cellular carrier data networks; and virtual networks, such as a virtual private network.

The system is one example for executing applications according to an embodiment of the invention. In another embodiment, application server 910, web server 920, and optionally database 930 can be combined into a single server computer application and system. In a further embodiment, virtualization and virtual machine applications may be used to implement one or more of the application server 910, web server 920, and database 930. In still further embodiments, all or a portion of the web and application serving functions may be integrated into an application running on each of the user computers. For example, a JavaScript application on the user computer may be used to retrieve or analyze data and display portions of the applications.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nano-engineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for generating a chain visualization for interactively displaying hierarchical data on a user device in a computing environment, the computing environment including a software application, a user device screen, and a system for receiving user inputs, the method comprising the following steps:

receiving hierarchical data from a data storage system, including at least a first data item, a second data item descended from the first data item, and third and fourth data items descended from the second data item;

transforming the hierarchical data from database objects to a linear series of graphical objects configured to represent a hierarchical state of the hierarchical data relative to an active item location, wherein the active item location is configured as a chain visualization junction positioned within the linear series of graphical objects in response to user input connecting an ancestors chain and descendants chain together, wherein the linear series of graphical objects are assigned to the ancestors chain or the descendants chain in response to which graphical object of the linear series of graphical objects is positioned within the active item location;

generating for display the chain visualization including: the ancestors chain oriented in a first direction;
the active item location;
the descendants chain oriented in the first direction, the ancestors chain and descendants chain meeting in the active item location;
a first graphical object representing the first data item, wherein the first graphical object is directly associated with the ancestors chain;
a second graphical object representing the second data item, wherein the second graphical object is displayed in the active item location;
a third graphical object representing the third data item, wherein the third graphical object is directly associated with the descendants chain;
a fourth graphical object representing the fourth data item, wherein the fourth graphical object is directly associated with the descendants chain, wherein at least one of the first through the fourth graphical objects is styled as a first shape configurable using at least one gesture input, wherein a second shape representing a top level of the hierarchal data is positioned uniquely relative to the ancestors chain, wherein a third shape representing another level of the hierarchical data includes a direction indicator portion pointing to a location on at least one of the ancestors chain and the descendants chain;
wherein the ancestors chain and the descendants chain are configured to visually intersect at the active item location and are aligned along the first direction such that the ancestors chain and descendants chain visually form the chain visualization into a single chain of the linear series of graphical objects aligned in the first direction;
forwarding the chain visualization to the user device to display it on the user device screen; and
wherein the system for receiving user inputs includes a user selection input type associated with selecting and deselecting a graphical object and a user navigation input type associated with activating a graphical object.

2. The method of claim 1, further comprising:
in response to receiving a user navigation input activating a fifth graphical object representing a fifth data item:
determining a first subset of the hierarchical data, the first subset of the hierarchical data including data items that are hierarchical ancestors of the fifth data item;
determining a second subset of the hierarchical data, the second subset including data items that are hierarchical descendants of the fifth data item;
updating the chain visualization for display, including:
removing a graphical object representing a previously active data item from the active item location;
displaying the fifth graphical object in the active item location;
generating for display ancestor graphical objects for at least part of the first subset data items and visually directly associating the ancestor graphical objects with the ancestors chain;
generating for display descendant graphical objects for at least part of the second subset data items and visually directly associating the descendant graphical objects with the descendants chain; and
forwarding the updated chain visualization to the user device to display it on the user device screen.

3. The method of claim 2, wherein the first subset is limited to data items that are hierarchical ancestors of the fifth data item in a direct line.

4. The method of claim 2, wherein the first subset does not include hierarchical peers.

5. The method of claim 2, wherein the second subset is limited to data items that are immediate descendants of the fifth data item.

6. The method of claim 1, wherein the system for receiving user inputs includes a user stacking input type associated with stacking two or more graphical objects, further comprising:
in response to receiving a user stacking input on at least part of the graphical objects associated with the ancestors chain, replacing the at least part of the graphical objects associated with the ancestors chain by a single graphical object visually representing a stack of ancestor graphical objects; and
in response to receiving a user stacking input on at least part of the graphical objects associated with the descendants chain, replacing the at least part of the graphical objects associated with the descendants chain by a single graphical object visually representing a stack of descendant graphical objects.

7. The method of claim 6, wherein a highest graphical object on the stack of ancestor graphical objects represents one of a hierarchically highest and a hierarchically lowest of the at least part of the graphical objects associated with the ancestors chain.

8. The method of claim 6, wherein a highest graphical object on the stack of descendant graphical objects represents one of the hierarchically highest and the hierarchically lowest of the at least part of the graphical objects associated with the descendants chain.

9. The method of claim 6, wherein the system for receiving user inputs further includes a user de-stacking input type associated with de-stacking a single graphical object visually representing a stack of graphical objects, further comprising:
in response to receiving a user de-stacking input on the single graphical object visually representing a stack of ancestor graphical objects, replacing the single graphical object visually representing a stack of ancestor graphical objects by the at least part of the graphical objects associated with the ancestors chain; and
in response to receiving a user de-stacking input on the single graphical object visually representing a stack of descendant graphical objects, replacing the single graphical object visually representing a stack of descendant graphical objects by the at least part of the graphical objects associated with the descendants chain.

10. The method of claim 1, wherein the system for receiving user inputs includes a user first-level edit input type associated with editing a first level of information of a data item represented by a graphical object, and a user data edit input type, further comprising:
in response to receiving a user first-level edit input on a fifth graphical object representing a fifth data item:
presenting a first level of information of the fifth data item to a user;
in response to receiving a user data edit input on a property included in the first level of information, modifying the property according to the user data edit input; and
updating the fifth data item for the modified property.

11. The method of claim 10, wherein the system for receiving user inputs includes a user second-level edit input type associated with editing a second level of information of a data item represented by a graphical object, further comprising:
in response to receiving a user second-level edit input on the fifth graphical object:
presenting a second level of information of the fifth data item to the user;
in response to receiving a user data edit input on a property included in the second level of information, modifying the property according to the user data edit input; and
updating the fifth data item for the modified property.

12. The method of claim 1, wherein:
the chain visualization is scrollable in the first direction;
the system for receiving user inputs includes a user scroll-down type, associated with scrolling down the chain visualization in the first direction; and further comprising in response to receiving a first user scroll-down input:
moving upwards respective locations of the ancestors chain, the active item location, the descendants chain, and the first, second, and third graphical objects.

13. The method of claim 12, further comprising in response to receiving a second user scroll-down input:
removing the ancestors chain and the first graphical object.

14. The method of claim 13, further comprising in response to receiving a third user scroll-down input:
removing the active item location and the second graphical object.

15. The method of claim 12, further comprising displaying a scroll indicator.

16. The method of claim 15, wherein the scroll indicator includes a scroll control.

17. The method of claim 15, wherein the scroll indicator includes a graphical object visually representing a stack of graphical objects.

18. The method of claim 1, wherein the system for receiving user inputs includes a user semantic zoom input type associated with decrementing or incrementing a number of text lines displayed in graphical objects, further comprising:
in response to receiving a user semantic zoom input:
decrementing or incrementing the number of text lines displayed in graphical objects;
resizing the graphical objects to fit the decremented or incremented number of text lines; and
displaying more or fewer graphical objects.

19. A system for generating an interactive chain visualization, comprising an application server coupled with a data storage device and adapted to receive requests and user input from a user device with a screen via at least one network, wherein the application server is programmed to perform a method comprising:
receiving hierarchical data from the data storage device, including at least a first data item, a second data item descended from the first data item, and third and fourth data items descended from the second data item;
transforming the hierarchical data from database objects to a linear series of graphical objects configured to represent a hierarchical state of the hierarchical data relative to an active item location, wherein the active item location is configured as a chain visualization junction positioned within the linear series of graphical objects in response to user input connecting an ancestors chain and descendants chain together, wherein the linear series of graphical objects are assigned to the ancestors chain or the descendants chain in response to which graphical object of the linear series of graphical objects is positioned within the active item location;

generating for display a chain visualization including:
the ancestors chain oriented in a first direction;
the active item location;
the descendants chain oriented in the first direction, the ancestors chain and descendants chain meeting in the active item location;
a first graphical object representing the first data item, wherein the first graphical object is directly associated with the ancestors chain;
a second graphical object representing the second data item, wherein the second graphical object is displayed in the active item location;
a third graphical object representing the third data item, wherein the third graphical object is directly associated with the descendants chain;
a fourth graphical object representing the fourth data item, wherein the fourth graphical object is directly associated with the descendants chain, wherein at least one of the first through the fourth graphical objects is styled as a first shape configurable using at least one gesture input, wherein a second shape representing a top level of the hierarchal data is positioned uniquely relative to the ancestors chain, wherein a third shape representing another level of the hierarchical data includes a direction indicator portion pointing to a location on at least one of the ancestors chain and the descendants chain;
wherein the ancestors chain and the descendants chain are configured to visually intersect at the active item location and are aligned along the first direction such that the ancestors chain and descendants chain visually form the chain visualization into a single chain of the linear series of graphical objects aligned in the first direction;
forwarding the chain visualization to the user device to display it on the screen; and
wherein the system for receiving user inputs includes a user selection input type associated with selecting and deselecting a graphical object and a user navigation input type associated with activating a graphical object.

20. A tangible, non-transitory computer-readable information storage medium including instructions adapted to direct a processor to perform a series of operations, the operations comprising:
receiving hierarchical data from a data storage system, including at least a first data item, a second data item descended from the first data item, and third and fourth data items descended from the second data item;
transforming the hierarchical data from database objects to a linear series of graphical objects configured to represent a hierarchical state of the hierarchical data relative to an active item location, wherein the active item location is configured as a chain visualization junction positioned within the linear series of graphical objects in response to user input connecting an ancestors chain and descendants chain together, wherein the linear series of graphical objects are assigned to the ancestors chain or the descendants chain in response to which graphical object of the linear series of graphical objects is positioned within the active item location;
generating for display a chain visualization including:
the ancestors chain oriented in a first direction;
the active item location;
the descendants chain oriented in the first direction, the ancestors chain and descendants chain meeting in the active item location;
a first graphical object representing the first data item, wherein the first graphical object is directly associated with the ancestors chain;
a second graphical object representing the second data item, wherein the second graphical object is displayed in the active item location;
a third graphical object representing the third data item, wherein the third graphical object is directly associated with the descendants chain;
a fourth graphical object representing the fourth data item, wherein the fourth graphical object is directly associated with the descendants chain, wherein at least one of the first through the fourth graphical objects is styled as a first shape configurable using at least one gesture input, wherein a second shape representing a top level of the hierarchal data is positioned uniquely relative to the ancestors chain, wherein a third shape representing another level of the hierarchical data includes a direction indicator portion pointing to a location on at least one of the ancestors chain and the descendants chain;
wherein the ancestors chain and the descendants chain are configured to visually intersect at the active item location and are aligned along the first direction such that the ancestors chain and descendants chain visually form the chain visualization into a single chain of the linear series of graphical objects aligned in the first direction;
forwarding the chain visualization to a user device to display it on a user device screen; and
wherein a system for receiving user inputs includes a user selection input type associated with selecting and deselecting a graphical object and a user navigation input type associated with activating a graphical object.

* * * * *